US011520517B2

(12) United States Patent
Spica (10) Patent No.: US 11,520,517 B2
(45) Date of Patent: Dec. 6, 2022

(54) DATA LOGGING SUB-SYSTEM FOR MEMORY SUB-SYSTEM CONTROLLER (71) Applicant: Micron Technology, Inc., Boise, ID (US)

(72) Inventor: Michael Richard Spica, Eagle, ID (US)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 16/804,105

(22) Filed: Feb. 28, 2020

(65) Prior Publication Data
US 2021/0271408 A1 Sep. 2, 2021

(51) Int. Cl.
G06F 3/06 (2006.01)

(52) U.S. Cl.
CPC .......... G06F 3/0653 (2013.01); G06F 3/0604 (2013.01); G06F 3/0673 (2013.01)

(58) Field of Classification Search
CPC ..... G06F 3/0653; G06F 3/0604; G06F 3/0673
See application file for complete search history.

(56) References Cited

U.S. PATENT DOCUMENTS

| 7,548,964 B2 * | 6/2009 | Arndt | H04L 41/5009 370/409 |
| 8,209,681 B1 * | 6/2012 | Turner | G06F 21/53 718/1 |
| 10,025,535 B2 * | 7/2018 | Frickey, III | G06F 3/061 |
| 10,853,283 B1 * | 12/2020 | Drown | G06F 13/20 |
| 2018/0191381 A1 * | 7/2018 | Achtenberg | H03M 13/1105 |
| 2019/0294579 A1 * | 9/2019 | Das Sharma | G06F 13/4221 |
| 2020/0285386 A1 * | 9/2020 | Nelogal | G06F 3/0653 |

OTHER PUBLICATIONS

Electronics Tutorials, Combinational Logic, The Demultiplexer 2008, https://www.electronics-tutorials.ws/combination/comb_3.html (Year: 2008).*

* cited by examiner

Primary Examiner — Arpan P. Savla
Assistant Examiner — Edmund H Kwong
(74) Attorney, Agent, or Firm — Schwegman Lundberg & Woessner, P.A.

(57) ABSTRACT

Data traffic comprising data packets communicated between a memory sub-system and a host system is monitored by a processing device at the memory sub-system. Data packets are classified according to packet type. Log data comprising a frequency and latency information associated with each packet type is generated. The log data is stored in a memory component of the memory sub-system.

20 Claims, 5 Drawing Sheets

DATA LOGGING SUB-SYSTEM FOR MEMORY SUB-SYSTEM CONTROLLER

TECHNICAL FIELD

Embodiments of the disclosure relate generally to memory sub-systems and, more specifically, to a memory sub-system controller data logging sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Aspects of the present disclosure are directed a data logging sub-system of a memory sub-system controller. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

Data packets of various types can be exchanged between the memory sub-system and the host system for various purpose. As an example, transaction layer packets (TLPs) and data link layer packets (DLLPs) can be communicated back and forth between the memory sub-system and the host system. In addition to direct data communication, many of these types of data packets are exchanged between the memory sub-system and the host system to manage a quality of the link between the memory sub-system and the host system. Consequently, the type of data packets communicated over a communication channel and the frequency of communication of such packets can provide an indicator of the "health" of the communication channel.

Conventionally, an external tool called a protocol analyzer is used to capture and analyze data traffic over a communication channel to assess communication channel link quality. Typically, a protocol analyzer must be injected into the communication channel to enable evaluation of the channel. However, introduction of this new element into the channel may cause disruptions with the channel that result in issues with the accuracy of readings from the analyzer. Additionally, most protocol analyzers come in the form of lab instrumentation that used to analyze only small samples and are often incapable of obtaining protocol link information in volume as would be needed in volume manufacturing environments.

Aspects of the present disclosure address the above and other deficiencies with a memory sub-system controller configured to include a logging sub-system to monitor data traffic and generate log data comprising frequency and latency information associated with specific packet types communicated between a memory sub-system and a host system. In this way, the memory sub-system can report, a number of packets of a particular packet type received over a given time interval along with a statistical summary of latency associated with the particular packet type (e.g., a minimum, maximum, and average latency between data packets over the time interval).

Consistent with some embodiments, the logging sub-system may comprise counters and timers placed on both receiver (RX) and transmitter (TX) channels of a physical host interface used to transmit data between the host system and the memory sub-system. The counters and timers work in conjunction to count occurrences of each packet type over a time interval and measure latency between data packets. The logging sub-system generates and stores log data associated with data traffic across the host interface based on information generated by the counters and timers.

Having the logging sub-system generate the log data in this manner allows the memory sub-system controller to report information that is conventionally only available using a protocol analyzer thereby avoiding the need to use expensive lab instrumentation with low volume capabilities. By logging the data in this manner, the logging sub-system can allow protocol timing information to be collected in volume on the manufacturing flow thereby enabling degraded or broken parts and test sites to be identified and remedial actions to be taken before more severe problems manifest. For example, log data that indicates that the latency is too high or the frequency of TLP packets is abnormal can be used to identify a weak part or test site. The log data generated by the log component may enable performance tuning to improve memory sub-systems.

Figure 1:
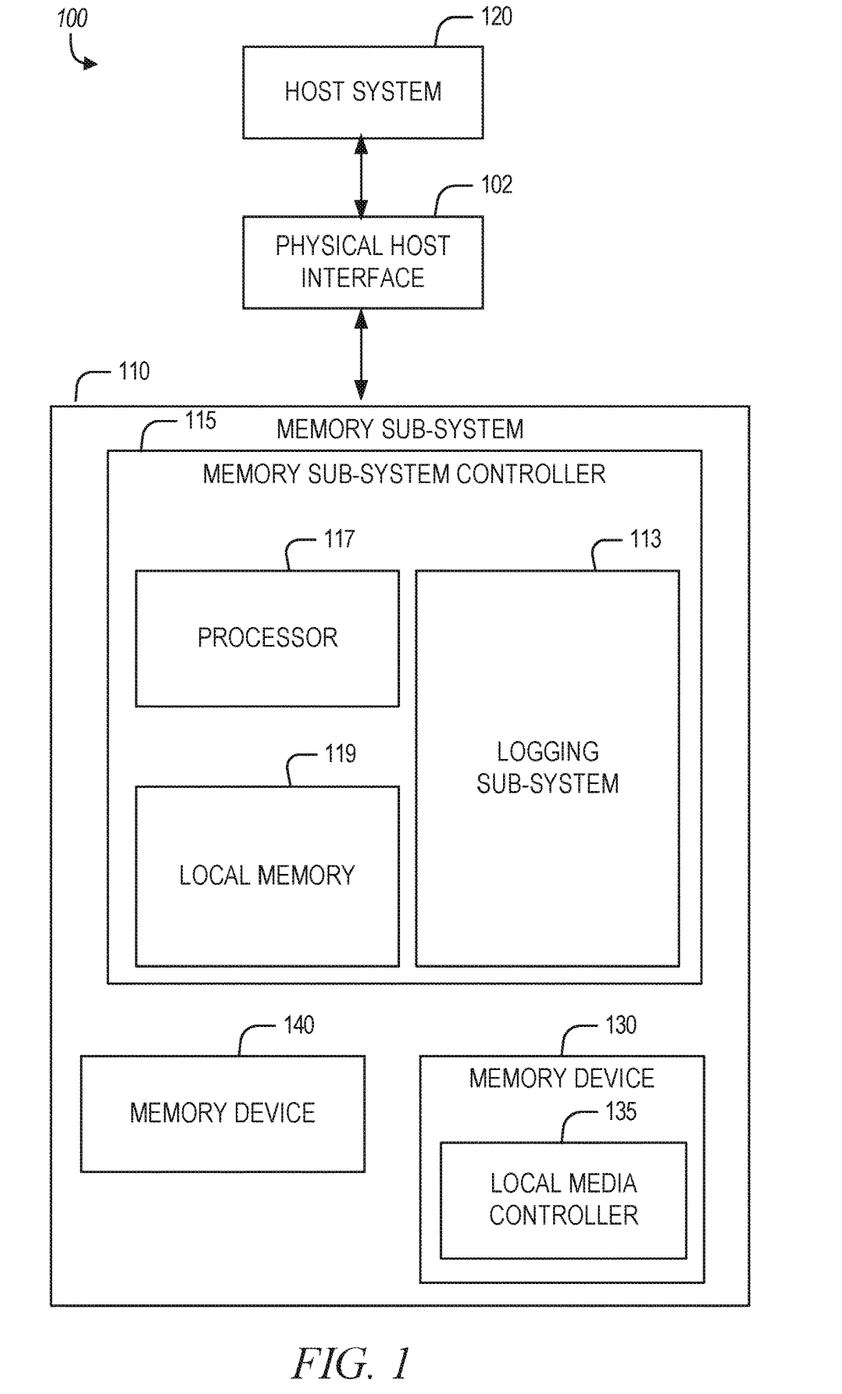
FIG. 1 illustrates an example computing system that includes a memory sub-system, in accordance with some embodiments of the present disclosure.

FIG. 1 illustrates an example computing system 100 that includes a memory sub-system 110, in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a SSD, a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT)

enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-systems 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and so forth.

The host system 120 can include a processor chipset and a software stack executed by the processor chipset. The processor chipset can include one or more cores, one or more caches, a memory controller NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface 102. Examples of the physical host interface 102 include, but are not limited to, a serial advanced technology attachment (SATA) interface, a peripheral component interconnect express (PCIe) interface, USB interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface 102 can be used to transmit data between the host system 120 and the memory sub-system 110. The host system 120 can further utilize an NVM Express (NVMe) interface to access the components (e.g., memory devices 130) when the memory sub-system 110 is coupled with the host system 120 by the PCIe interface. The physical host interface 102 can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130,140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) includes a NAND type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as NAND type flash memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor (processing device) 117 configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, and the like. The local memory 119 can also include ROM for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 120 via the physical host interface 102. The host interface circuitry can convert the commands received from the host system into command instructions to access the memory devices 130 and/or the memory device 140 and convert responses associated with the memory devices 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

As shown, the memory sub-system controller 115 includes a logging sub-system 113 to monitor and generate log data describing data packets exchanged between the host system 120 and the memory sub-system 110 via the physical host interface 102. Log data generated by the logging sub-system 113 can comprise frequency and latency information associated with data exchanged between the host system 120 and the memory sub-system 110. Data packets exchanged between the host system 120 and the memory sub-system 110 can be of various packet types (e.g., transaction layer packets (TLPs), data link layer packets (DLLPs), or other packet types) and the log data can be specifically organized according to packet type. That is, the log data can comprise frequency and latency information associated with specific packet types. As an example, the log data can comprise data describing a frequency and latency of DLPs exchanged via the physical host interface 102 as well as data describing a frequency and latency of TLPs exchanged via the physical host interface 102. Further details regarding the logging sub-system 113 are discussed below.

Although FIG. 1 illustrates the logging sub-system 113 residing on the memory sub-system controller 115, it shall be appreciated that in other embodiments, the logging sub-system 113 may reside on the local media controller 135. Further, in some embodiments, a logging sub-system 113 may be implemented within both the memory sub-system controller 115 and the local media controller 135. In addition, in some embodiments, the logging sub-system 113 can be incorporated into a protocol engine of the memory sub-system 110.

Figure 2:
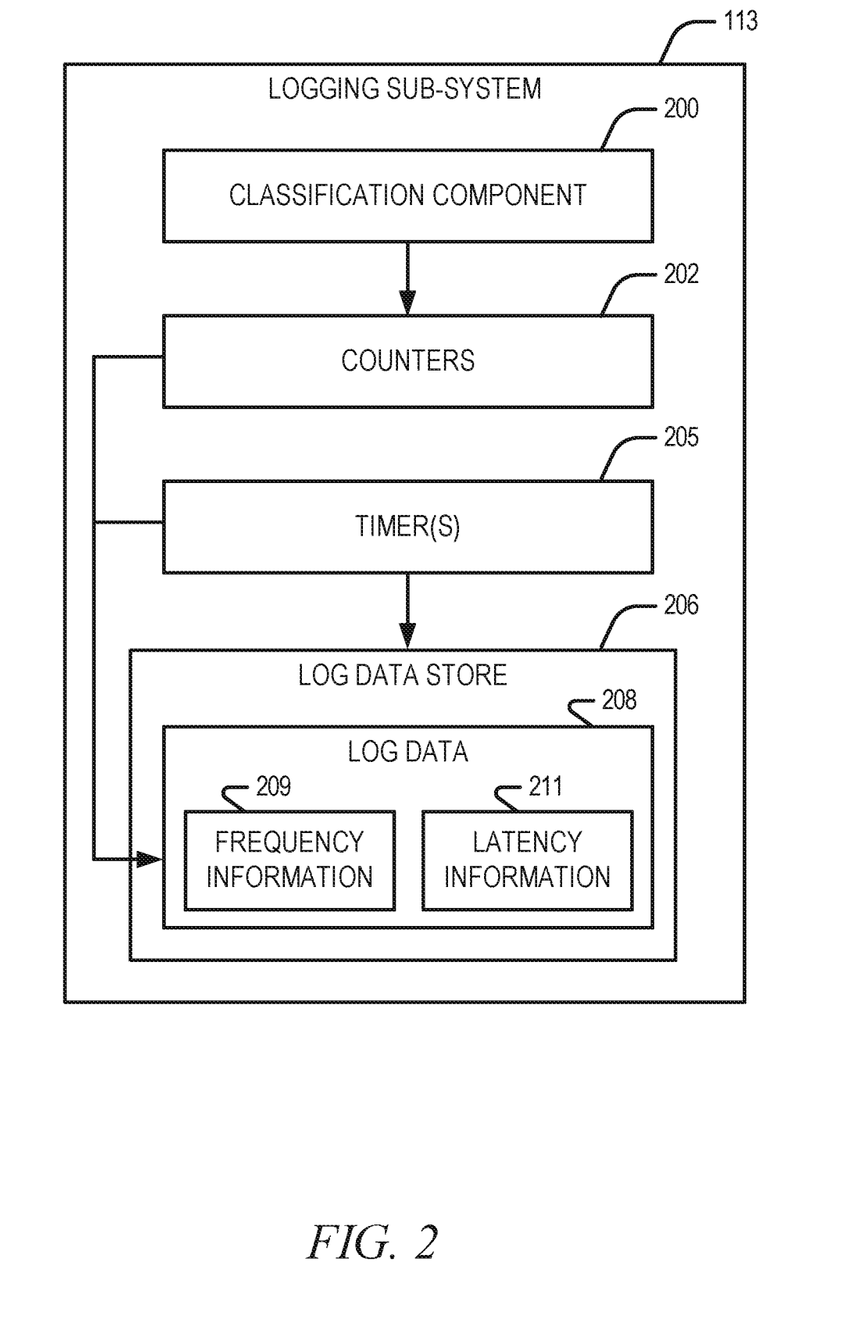
FIG. 2 illustrates components of a logging sub-system that can be included in the memory sub-system, in accordance with some embodiments of the present disclosure.

FIG. 2 illustrates components of the logging sub-system 113, in accordance with some embodiments of the present disclosure. As shown, the logging sub-system 113 comprises a classification component 200, counter(s) 202, timer(s) 205, and a log data store 206.

In general, the logging sub-system 113 monitors data data traffic communicated between the host system 120 and the memory sub-system 110 via the physical host interface 102. The data data traffic comprises data packets of various packet types. The classification component 200 classifies data packets in the monitored data traffic according to packet type. For example, each data packet can comprise an indicator of packet type (e.g., in a packet header), and the classification component 200 can classify each data packet based on respective packet type indicators.

The log data store 206 stores log data 208 describing data packets communicated between the memory sub-system 110 and the host system 120. The log data store 206 can be implemented in the local memory 119 or one of the memory devices 130 or 140. The log data 208 comprises a frequency information 209 and latency information 211 associated with specific packet types. The latency, information 211 can include a statistical summary of latency associated with the packet type (e.g., a minimum, maximum, and average latency). The logging sub-system 113 generates the log data 208 based on information generated by the classification component 200, counters 202, and timer 205.

The counters 202 are responsible for counting occurrences of each packet type over a time interval. For example, a counter 202 can be designated for each packet type. For example, a first counter can be specifically designated to count occurrences of packets of a first packet type, a second counter can be specifically designated to count occurrences of packets of a second packet type, a third counter can be specifically designated to count occurrences of packets of a third packet type, and so forth. In some embodiments, a multiplexer (not shown) or other suitable component may be used to send data packets to the appropriate counter 202. That is, the multiplexer may send a data packet of a particular packet type to the counter 202 that is specifically designated to count instances of the packet type. For example, the classification component 200 can send a data packet to the counter 202 corresponding to the packet type by providing the multiplexer with a control signal that is based on packet type.

On or more timer(s) 205 are included in the logging sub-system 113 to measure time. For example, the timer 205 measures the time interval during which each counter counts occurrences of each packet type. That is, the timer 205 constrains the count of occurrences of each packet type to the time interval. In this manner, frequency information 209 may be derived for each packet type.

The logging sub-system 113 can further utilize one or more timer(s) 205 to measure a latency associated with each packet type, which can be included in the latency information 209. In some embodiments, each timer 205 can comprise timing circuitry to measure time (e.g., a clock circuit).

One or more counters 202 and one or more timers 205 can be placed on both receiver (RX) and transmitter (TX) communication channels of the physical host interface 102 so as to monitor and log both incoming as well as outgoing data packets.

Figure 3:
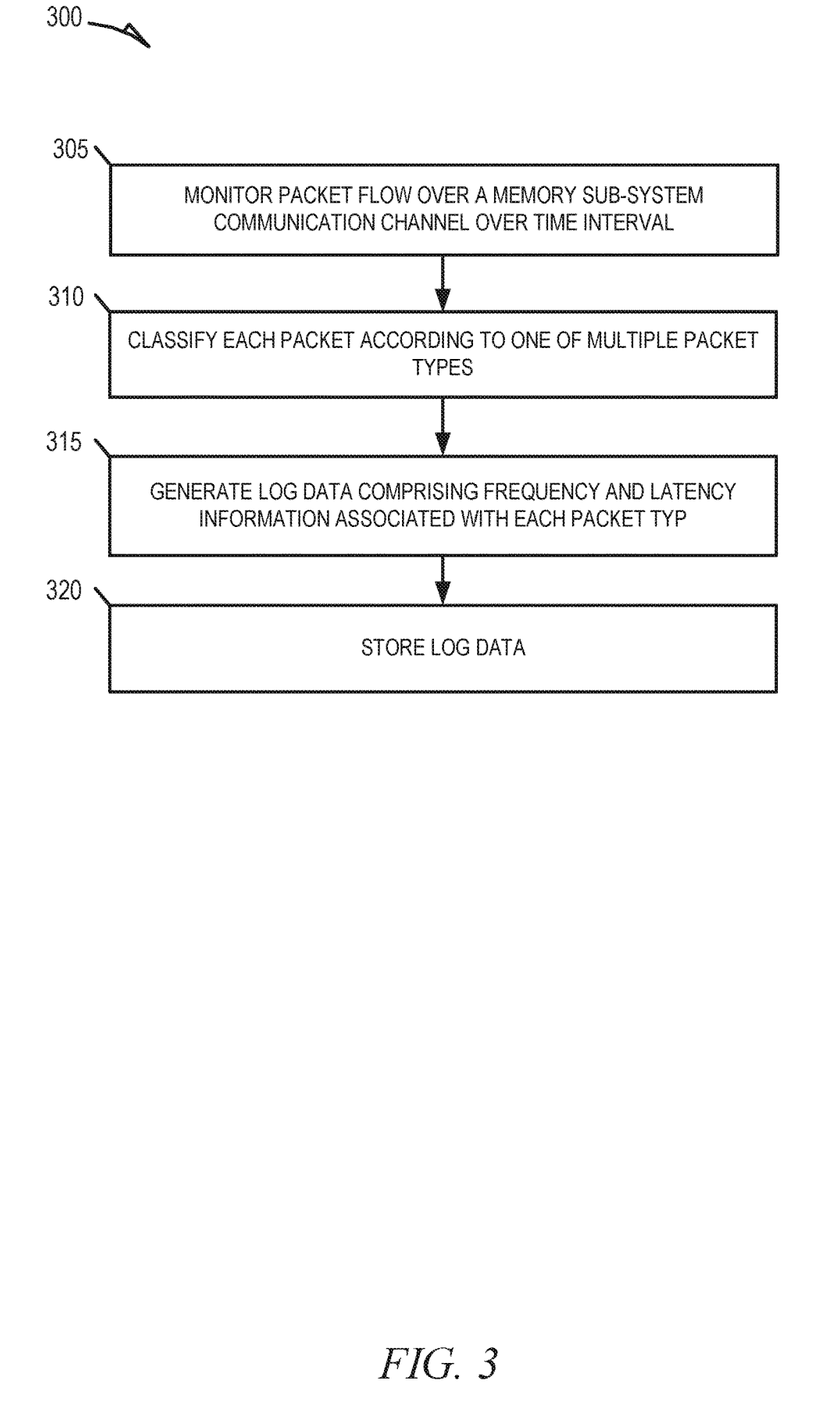
FIGS. 3 and 4 are flow diagrams of an example method of logging data about data traffic over a memory sub-system communication channel, in accordance with some embodiments of the present disclosure.
Figure 4:
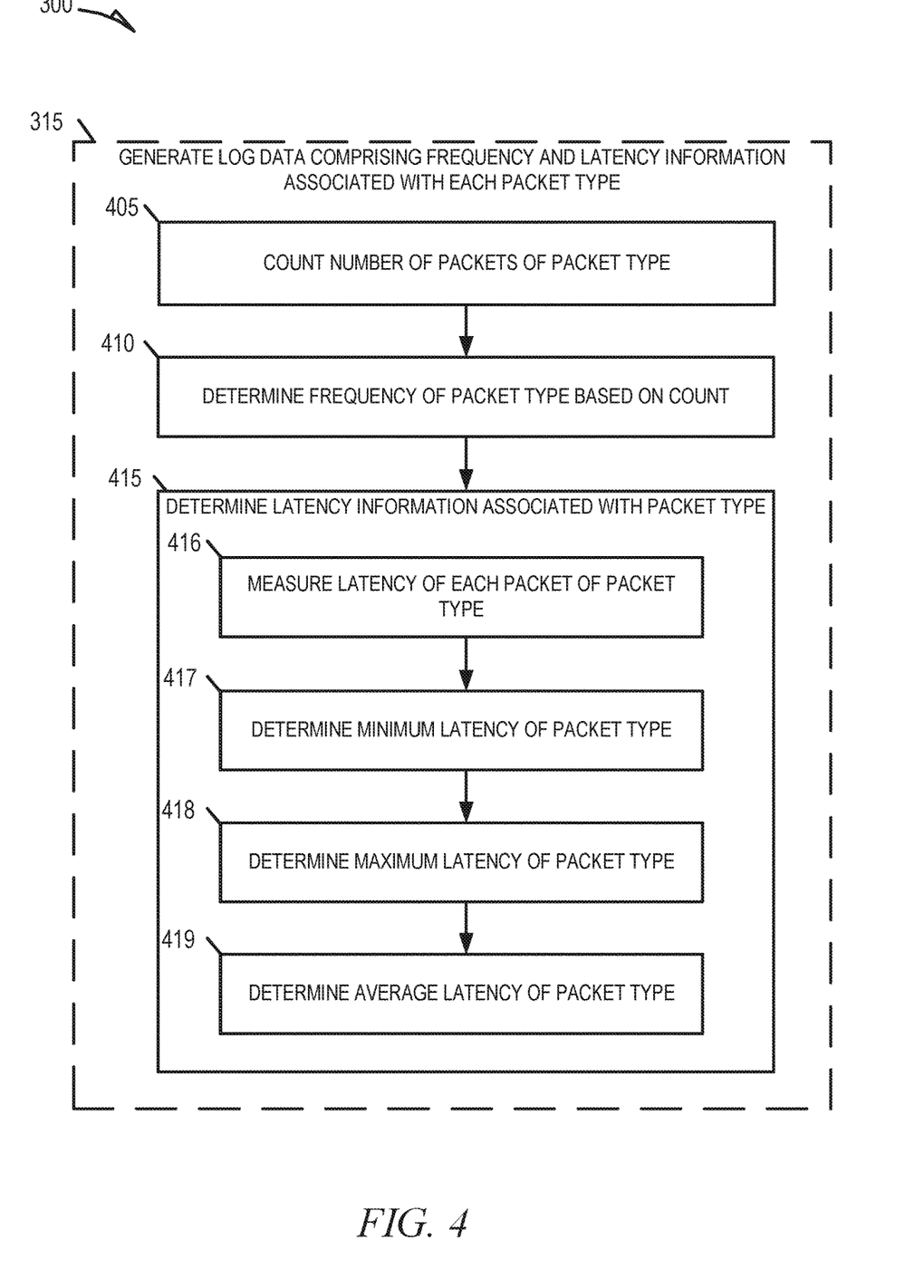

FIGS. 3 and 4 are flow diagrams of an example method 300 to log frequency and latency information associated with data traffic over a communication channel of a memory sub-system, in accordance with some embodiments of the present disclosure. The method 300 can be performed by processing logic that can include hardware processing device, circuitry, dedicated logic, programmable logic, microcode, hardware of a device, integrated circuit, etc.), software (e.g., instructions run or executed on a processing device), or a combination thereof. In some embodiments, the method 300 is performed by the logging sub-system 113. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 305, the processing device monitors data traffic over a communication channel of a host interface (e.g., a receiver or transmitter channel of the physical host interface 102) of a memory sub-system (e.g., the memory sub-system 110) over a time interval. The time interval can be determined by a timer included in or in communication with the processing device.

The data traffic comprises a plurality of data packets communicated between the memory sub-system and a host system (e.g., the host system 120). As an example, the data traffic can comprise data packets received by the memory sub-system from the host system via a receiver channel of the host interface. In another example, the data traffic can comprise data packets transmitted from the memory sub-system to the host system via a transmitter channel of the host interface. The communication channel of the host interface can, for example, correspond to a PCIe communication channel, a UFS communication channel, or a SATA communication channel.

The processing device classifies each data packet in the data traffic according to one of multiple packet types, at operation 310. Each data packet can indicate a packet type, for example, in a packet header, and the processing device can classify a data packet according to the packet type indicated by the packet. For example, the processing device can determine a data packet is a DLLP based on an indicator in the data packet indicating that the data packet is a DLLP.

At operation 315, the processing device generates log data comprising a frequency of occurrence of each packet type and latency information associated with each packet type. Accordingly, in generating the log data, the processing device can determine a frequency of each packet type and determine latency information associated with each packet type. Further details regarding the generation of the log data are discussed below in reference to FIG. 4.

The processing device stores the log data at operation 320. For example, the processing device can comprise a log data store, and the processing device may store the log data generated at operation 315 in the log data store. As noted above, the log data store can be implemented within a memory component of the memory sub-system. For example, the log data store may be implemented within a memory device (e.g., memory device 130 or 140) or within a local memory of a memory sub-system controller (e.g., local memory 119 of memory sub-system controller 115).

As shown in FIG. 4, the method 300 may, in some embodiments, include operations 305, 310, and 315. Consistent with these embodiments, the operations 305, 310, and 315 can be performed as part of (e.g., sub-operations or a sub-routine) operation 315 where the processing device generates log data. Although the operations 305, 310, and 315 are described with respect to a single packet type, it shall be appreciated that in generating the log data the operations 305, 310, and 315 can be performed for each packet type observed in the data traffic on the communication channel of the memory sub-system.

At operation 405, the processing device counts a number of packets of a packet type communicated over the communication channel over the time interval. As an example, the processing device can comprise a hardware counter to count each packet of the packet type and a timing circuitry to measure the time interval and constrain the count thereto. In some embodiments, the processing device may include multiple hardware counters and each counter can be specifically designated to count occurrences of a particular packet type. Consistent with these embodiments, the processing device may further include one or more multiplexers to send packets to the appropriate one of the counters. For example, a multiplexer control signal can be associated with packet type such that packet type can be used to select a counter to which a packet received at the multiplexer input is sent.

The processing device determines a frequency of the packet type in the data traffic based on the number of packets of the packet type communicated over the communication channel over the time interval, at operation 410. That is, the frequency of the packet type comprises the number of packets of the packet type communicated over the communication channel over the time interval.

The process device, at operation 415, determines latency information associated with the packet type. The latency information can comprise a statistical summary associated with packet latency. For example, the latency information can comprise a minimum latency, a maximum latency, and an average latency. Accordingly, as shown, the operation 415, can comprise operations 416-419. At operation 416, the processing device measures a latency of each packet of the packet type. The processing device measures latency of a data packet based on a number of clock cycles in which no data packets are communicated over the communication prior to or after communicating the data packet over the communication channel.

In an example, the processing device may measure the latency of a first packet by measuring an amount of time between the first packet and a second packet being communicated over the communication channels. In some embodiments, the first and second packet correspond to the same packet type. That is, consistent with these embodiments, the processing device measures the amount of time between two packets of the same packet type being communicated over the communication channel.

Based on the latencies measured at operation 416, the processing device determines a minimum latency (at operation 417), a maximum latency (at operation 418), and an average latency (at operation 419) of the packet type observed over the time interval.

Examples

Example 1 is a memory sub-system comprising: a memory component comprising a log data store; and a processing device coupled to the log data store, the processing device to perform operations comprising: monitoring data traffic over a communication channel of a physical host interface over a time interval, the data traffic comprising data packets communicated between the memory sub-system and the host system via the communication channel of the physical host interface; classifying each data packet in the data traffic according to packet type; generating log data comprising a frequency of each packet type in the data traffic and latency information associated with each packet type; and storing the log data in the log data store.

Example 2 comprises the subject matter of Example 1, and the classifying of each data packet optionally comprises determining a data packet type of data packet based on a packet type indicator included in the data packet.

Example 3 comprises the subject matter of any one of Examples 1 and 2, and the generating of the log data optionally comprises: counting a number of packets of a packet type communicated over the communication channel over the time interval; and determining a frequency of the packet type based on the number of packets of the packet type communicated over the communication channel over the time interval.

In Example 4, the subject matter of any one of Examples 1-3, optionally further comprises one or more hardware counters to count the number of packets of the packet type communicated over the communication channel over the time interval.

In Example 5, the subject matter of any one of Examples 1-4 optionally further comprises: a timer to measure the time interval.

Example 6 comprises the subject matter of any one of Examples 1-5 and the generating of the log data optionally comprises: determining latency information associated with a packet type, the latency information including summary statistics associated with packet latency.

Example 7 comprises the subject matter of any one of Examples 1-6 and optionally further comprises: measuring a latency of each data packet of the packet type; determining a minimum latency of the packet type; determining a maximum latency of the packet type; and determining an average latency of the packet type.

Example 8 comprises the subject matter of any one of Examples 1-7 and optionally further comprises measuring latency of a data packet based on a number of clock cycles in which no data packets are communicated over the communication prior to or after communicating the data packet over the communication channel.

Example 9 comprises the subject matter of any one of Examples 1-8 and the communication channel is one of: a receiver channel or a transmitter channel of the host interface.

Example 10 comprises the subject matter of any one of Examples 1-9 and the host interface optionally comprises one of: a peripheral component interconnect express (PCIe), a Universal Flash Storage (UFS) communication channel, or a Serial Advanced Technology Attachment (SATA) communication channel.

Example 11 is a method comprising: monitoring, by a memory sub-system controller, data traffic over a communication channel of a physical host interface over a time interval, the data traffic comprising data packets communicated between a memory sub-system and a host system via the communication channel of the physical interface; classifying, by the memory sub-system controller, each data packet in the data traffic according to packet type; generating, by the memory sub-system controller, log data comprising a frequency of each packet type in the data traffic and latency information associated with each packet type; and storing the log data in a log data store of the memory sub-system.

Example 12 comprises the subject matter of Example 11, and the classifying of each data packet optionally comprises determining a data packet type of data packet based on a packet type indicator included in the data packet.

Example 13 comprises the subject matter of any one of Examples 11 and 12, and the generating of the log data optionally comprises: counting a number of packets of a packet type communicated over the communication channel over the time interval; and determining a frequency of the packet type based on the number of packets of the packet type communicated over the communication channel over the time interval.

Example 14 comprises the subject matter of any one of Examples 11-13 and the generating of the log data optionally comprises: determining latency information associated with a packet type, the latency information including summary statistics associated with packet latency.

Example 15 comprises the subject matter of any one of Examples 11-14 and optionally further comprises: measuring a latency of each data packet of the packet type; determining a minimum latency of the packet type; determining a maximum latency of the packet type; and determining an average latency of the packet type.

Example 16 comprises the subject matter of any one of Examples 11-15 and optionally further comprises measuring latency of a data packet based on a number of clock cycles in which no data packets are communicated over the communication prior to or after communicating the data packet over the communication channel.

Example 17 comprises the subject matter of any one of Examples 11-16 and the communication channel is one of: a receiver channel or a transmitter channel of the host interface.

Example 18 comprises the subject matter of any one of Examples 11-17 and the host interface optionally comprises one of: a peripheral component interconnect express (PCIe), a Universal Flash Storage (UFS) communication channel, or a Serial Advanced Technology Attachment (SAT A) communication channel.

Example 19 is a non-transitory computer-readable storage medium comprising instructions that, when executed by a processing device, configures the processing device to perform operations comprising: monitoring data traffic over a communication channel of a physical host interface over a time interval, the data traffic comprising data packets communicated between the memory sub-system and the host system via the communication channel of the physical host interface; classifying each data packet in the data traffic according to packet type; generating log data comprising a frequency of each packet type in the data traffic and latency information associated with each packet type; and storing the log data in a log data store.

Example 20 comprises the subject matter of Example 19, and the generating of the log data optionally comprises: counting a number of packets of a packet type communicated over the communication channel over the time interval; and determining a frequency of the packet type based on the number of packets of the packet type communicated over the communication channel over the time interval.

Figure 5:
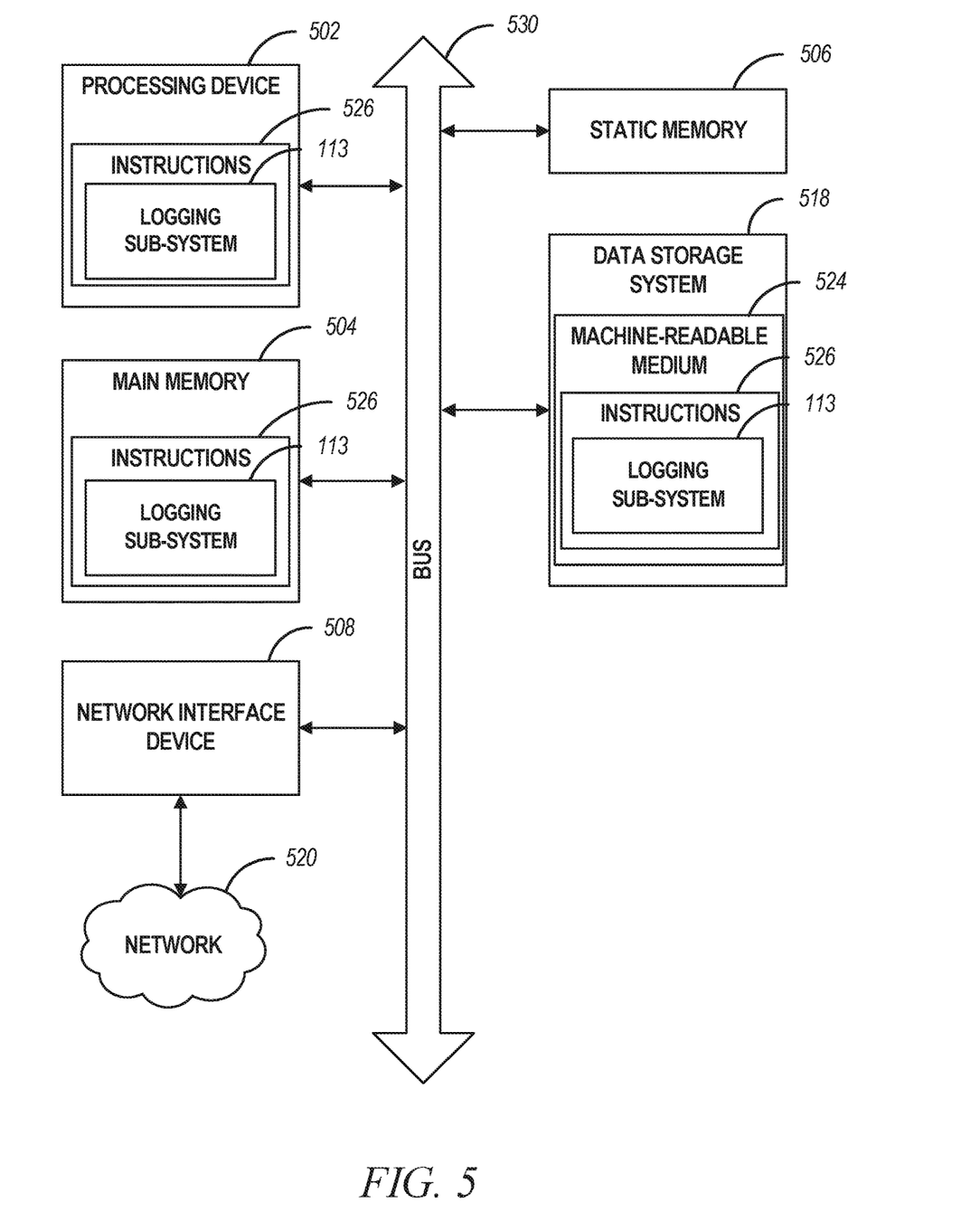
FIG. 5 is a block diagram of an example computer system in which embodiments of the present disclosure may operate.

FIG. 5 illustrates an example machine in the form of a computer system 500 within which a set of instructions can be executed for causing the machine to perform any one or more of the methodologies discussed herein. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the logging sub-system 113 of FIG. 1). In alternative embodiments, the machine can be connected (e.g., networked) to other machines in a local area network (LAN), an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., ROM, flash memory, DRAM such as SDRAM or Rambus DRAM (RDRAM), etc.), a static memory 506 (e.g., flash memory, static random access memory (SRAM), etc.), and a data storage system 518, which communicate with each other via a bus 530.

The processing device 502 represents one or more general-purpose processing devices such as a microprocessor, a central processing unit, or the like. More particularly, the processing device 502 can be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 502 can also be one or more special-purpose processing devices such as an ASIC, an FPGA, a digital signal processor (DSP), a network processor, or the like. The processing device 502 is configured to execute instructions 526 for performing the operations and steps discussed herein. The computer system 500 can further include a network interface device 508 to communicate over a network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality corresponding to a security component (e.g., the logging sub-system 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system's memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer-readable storage medium, such as, but not limited to, any type of disk including floppy disks, optical disks, CD-ROMs, and magnetic-optical disks; ROMs; RAMs; erasable programmable read-only memories (EPROMs); EEPROMs; magnetic or optical cards; or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description above. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any In the foregoing specification, embodiments of the disclosure have been described with reference to specific example embodiments thereof. It will be evident that various modifications can be made thereto without departing from the broader scope of embodiments of the disclosure as set forth in the following claims. The specification and drawings are, accordingly, to be regarded in an illustrative sense rather than a restrictive sense.

What is claimed is:

1. A memory sub-system comprising:
a memory component comprising a log data store; and
a processing device coupled to the memory component, the processing device comprising:
a first hardware counter designated for counting transaction layer packets (TLPs);
a second hardware counter designated for counting data link layer packets (DLLPs);
a multiplexer to send packets to the first hardware counter and the second hardware counter;
the processing device to perform operations comprising:
monitoring data traffic over a communication channel of a physical host interface over a time interval, the data traffic comprising data packets communicated between the memory sub-system and a host system via the communication channel of the physical host interface;
classifying each data packet in the data traffic according to packet type;
sending, by the multiplexer, at least one packet classified as a TLP to the first hardware counter;
sending, by the multiplexer, at least one packet classified as a DLLP to the second hardware counter;
generating log data comprising a frequency of each packet type in the data traffic and latency information associated with each packet type, the generating of log data comprising:
counting, by the first hardware counter, a number of TLPs communicated over the communication channel over the time interval; and
determining a frequency of TLPs in the data traffic based on the number of TLPs communicated over the communication channel over the time interval; and
storing the log data in the log data store.

2. The memory sub-system of claim 1, wherein:
the classifying of each data packet comprises determining a data packet type of data packet based on a packet type indicator included in the data packet.

3. The memory sub-system of claim 1, wherein:
the generating of the log data further comprises:
counting, by the second hardware counter, a number of DLLPs communicated over the communication channel over the time interval; and
determining a frequency of DLLPs in the data traffic based on the number of DLPs communicated over the communication channel over the time interval.

4. The memory sub-system of claim 3, wherein:
monitoring the data traffic includes monitoring incoming and outgoing data packets; and classifying each data packet in the data traffic comprises classifying one or more incoming data packets and one or more outgoing data packets according to packet type.

5. The memory sub-system of claim 1, wherein the processing device further comprises a timer to measure the time interval.

6. The memory sub-system of claim 1, wherein the generating of the log data comprises:
determining the latency information associated with TLPs, the latency information including summary statistics associated with packet latency.

7. The memory sub-system of claim 6, wherein the determining of the latency information associated TLPs comprises:
measuring a latency of each TLP;
determining a minimum latency of TLPs type;
determining a maximum latency of TLPs; and
determining an average latency of TLPs.

8. The memory sub-system of claim 7, wherein the measuring the latency of each TLP comprises:
measuring a latency of a first TLP based on a number of clock cycles between the first data packet and a second TLP being communicated over the communication channel.

9. The memory sub-system of claim 1, wherein the communication channel is one of: a receiver channel or a transmitter channel of the host interface.

10. The memory sub-system of claim 1, wherein the host interface comprises one of: a peripheral component interconnect express (PCIe), a Universal Flash Storage (UFS) communication channel, or a Serial Advanced Technology Attachment (SATA) communication channel.

11. A method comprising:
monitoring, by a memory sub-system controller, data traffic over a communication channel of a physical host interface over a time interval, the data traffic comprising data packets communicated between a memory sub-system and a host system via the communication channel of the physical interface, the memory sub-system controller comprising:
a first hardware counter designated for counting transaction layer packets (TLPs);
a second hardware counter designated for counting data link layer packets (DLLPs);
a multiplexer to send packets to the first hardware counter and the second hardware;
classifying, by the memory sub-system controller, each data packet in the data traffic according to packet type;
sending, by the multiplexer of the memory sub-system controller, at least one packet classified as a TLP to the first hardware counter;
sending, by the multiplexer of the memory sub-system controller, at least one packet classified as a DLLP to the second hardware counter;
generating, by the memory sub-system controller, log data comprising a frequency of each packet type in the data traffic and latency information associated with each packet type, the generating of log data comprising:
counting, by the first hardware counter, a number of TLPs communicated over the communication channel over the time interval; and
determining a frequency of TLPs in the data traffic based on the number of TLPs communicated over the communication channel over the time interval; and
storing the log data in a log data store of the memory sub-system.

12. The method of claim 11, wherein the classifying of each data packet comprises determining a data packet type of data packet based on a packet type indicator included in the data packet.

13. The method of claim 11, wherein the generating of the log data comprises:
   counting, by second hardware counter, a number of DLLPs communicated over the communication channel over the time interval; and
   determining a frequency of DLLPs in the data traffic based on the number of DLLPs communicated over the communication channel over the time interval.

14. The method of claim 12, wherein the generating of the log data comprises:
   determining the latency information associated with TLPs, the latency information including summary statistics associated with packet latency.

15. The method of claim 14, wherein the determining of the latency information associated with TLPs comprises:
   measuring a latency of each data packet of TLPs;
   determining a minimum latency of TLPs;
   determining a maximum latency of TLPs; and
   determining an average latency of TLPs.

16. The method of claim 14, wherein measuring a latency of each data packet of the first packet type comprises:
   measuring latency of a data packet based on a number of clock cycles in which no data packets are communicated over the communication prior to or after communicating the data packet over the communication channel.

17. The method of claim 11, wherein the communication channel is one of: a receiver channel or a transmitter channel of the host interface.

18. The method of claim 11, wherein the host interface comprises one of: a peripheral component interconnect express (PCIe), a Universal Flash Storage (UFS) communication channel, or a Serial Advanced Technology Attachment (SATA) communication channel.

19. A non-transitory computer-readable storage medium comprising instructions that, when executed by a processing device, configures the processing device to perform operations comprising:
   monitoring data traffic over a communication channel of a physical host interface over a time interval, the data traffic comprising data packets communicated between a memory sub-system and a host system via the communication channel of the physical host interface;
   classifying each data packet in the data traffic according to packet type;
   providing at least one signal to a multiplexer that causes the multiplexer to send at least one packet classified as a transaction layer packet (TLP) to a first hardware counter designated for counting TLPs;
   providing at least one signal to the multiplexer that causes the multiplexer to send at least one packet classified as a data link layer packet (DLLP) to a second hardware counter designated for counting DLLPs;
   generating log data comprising a frequency of each packet type in the data traffic and latency information associated with each packet type, the generating of log data comprising:
   counting, by the first hardware counter, a number of TLPs communicated over the communication channel over the time interval; and
   determining a frequency of TLPs in the data traffic based on the number of TLPs communicated over the communication channel over the time interval; and
   storing the log data in a log data store.

20. The non-transitory computer-readable storage medium of claim 19, wherein the instructions further configured the processing device to perform operations:
   counting, by the second hardware counter, a number of DLLPs communicated over the communication channel over the time interval; and
   determining a frequency of DLLPs in the data traffic based on the number of DLLPs communicated over the communication channel over the time interval.

* * * * *